(12) United States Patent
Wei

(10) Patent No.: US 11,643,285 B1
(45) Date of Patent: May 9, 2023

(54) AUTOMATIC PICKING FIXTURE DEVICE

(71) Applicant: Fu-Han Wei, Taichung (TW)

(72) Inventor: Fu-Han Wei, Taichung (TW)

(*) Notice: Subject to any disclaimer, the term of this patent is extended or adjusted under 35 U.S.C. 154(b) by 0 days.

(21) Appl. No.: 17/521,858

(22) Filed: Nov. 9, 2021

(51) Int. Cl.
| | |
|---|---|
| B25J 15/02 | (2006.01) |
| B65G 47/90 | (2006.01) |
| B25J 15/08 | (2006.01) |
| B25J 15/10 | (2006.01) |

(52) U.S. Cl.
CPC .......... B65G 47/90 (2013.01); *B25J 15/026* (2013.01); *B25J 15/0253* (2013.01); *B25J 15/0273* (2013.01); *B25J 15/0293* (2013.01); *B25J 15/08* (2013.01); *B25J 15/106* (2013.01)

(58) Field of Classification Search
CPC .. B25J 15/026; B25J 15/0273; B25J 15/0293; B25J 15/08; B25J 15/106
USPC ...... 414/561; 410/82; 294/81.1, 81.2, 81.53, 294/81.21, 81.62
See application file for complete search history.

(56) References Cited

U.S. PATENT DOCUMENTS

| | | | | |
|---|---|---|---|---|
| 4,852,928 A * | 8/1989 | Monforte | ................. | B25J 15/04 294/902 |
| 5,163,729 A * | 11/1992 | Borcea | ................... | B25J 15/026 294/207 |
| 5,184,861 A * | 2/1993 | Voellmer | ............... | B25J 15/026 901/41 |
| 6,039,375 A * | 3/2000 | Bauman | ............... | B25J 15/0253 901/31 |
| 6,309,003 B1 * | 10/2001 | Bertini | ................. | B25J 15/0253 294/207 |
| 2002/0093212 A1 * | 7/2002 | Ostholt | ............... | B25J 15/0253 294/119.1 |
| 2006/0175852 A1 * | 8/2006 | Sotome | .................. | B25J 15/026 294/207 |
| 2006/0182603 A1 * | 8/2006 | Hawes | ................. | B25J 15/0253 414/735 |
| 2012/0175903 A1 * | 7/2012 | Murakami | ............ | B25J 15/026 901/31 |

* cited by examiner

*Primary Examiner* — Ronald P Jarrett

(57) ABSTRACT

An automatic picking fixture device: a fixture locked with a mechanical arm and includes a coupling orifice, a motor, a rotor, and a gear. The fixture includes four elongated orifices and two movable holders. The two movable holders have four through orifices corresponding to the gear, four passing orifices, and two toothed sections received in the four through orifices and meshing with and driving the gear. The four passing orifices of the fixture is configured to lock with the four pneumatic cylinders or four servo motors, and the four pneumatic cylinders or the four servo motors are configured to push four jaws outward or inward, the four jaws include four symmetrical clamping grooves configured to clamp at least one material. The four racks are fixed on the top of the fixture, and a respective rack has two rollers rolling along a respective elongated orifice.

10 Claims, 17 Drawing Sheets

B - B

R - R

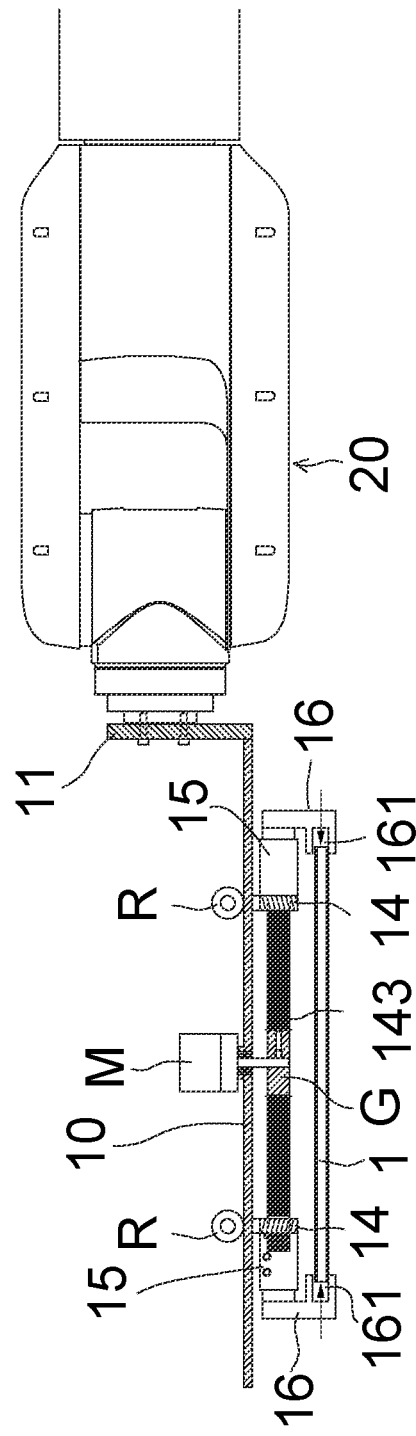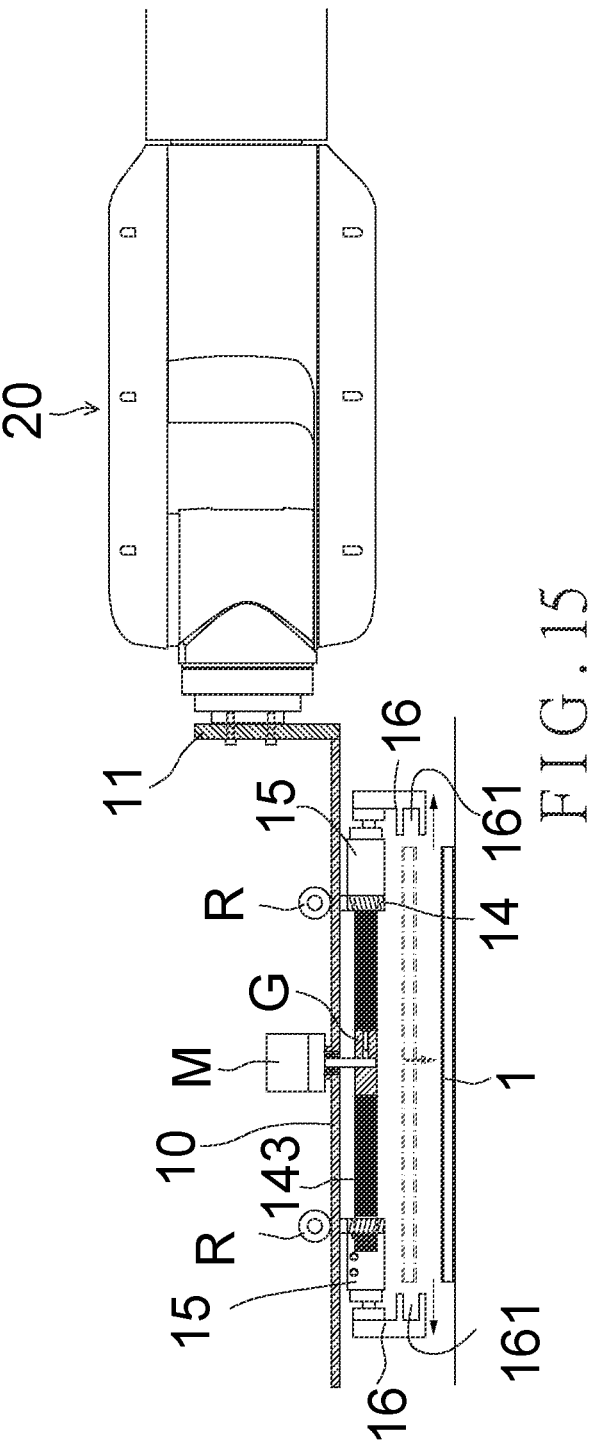

AUTOMATIC PICKING FIXTURE DEVICE

FIELD OF THE INVENTION

The present invention relates to an automatic picking fixture device, and more particularly to the automatic picking fixture device which is applied to manufacture insoles.

BACKGROUND OF THE INVENTION

Conventionally, insoles are thermoplastic cold molded or thermoplastic hot molded by manufacturing equipment.

However, the manufacturing equipment has following defects:

1) The insoles cannot be produced successively in 24 hours daily, thus having high labor cost and force.

2) The insoles are manufactured by at least thirteen people, for example, the insoles are formed by five people, are cut by five people, and trimmed by three people, thus consuming labor time and force greatly.

3) The insoles are produced by skilled workers to increase high training time and cost.

4) The workers have to contact with one another to increase high infection risk.

The present invention has arisen to mitigate and/or obviate the afore-described disadvantages.

SUMMARY OF THE INVENTION

One aspect of the present invention is to provide an automatic picking fixture device which is capable of overcoming the shortcomings of the automatic picking fixture device.

To obtain the above aspect, an automatic picking fixture device provided by the present invention contains: a fixture.

The fixture is locked with a mechanical arm and includes a coupling orifice defined on a center of the fixture, a motor mounted on a top of the fixture and corresponding to the coupling orifice, and a rotor of the motor rotatably connected in the coupling orifice. A bottom of the rotor is screwed with a gear.

The fixture includes four elongated orifices formed on two peripheral sides of the fixture parallelly, two movable holders mounted on two sides of a bottom of the fixture. The two movable holders have four through orifices defined on two inner walls thereof and corresponding to the gear. The fixture further includes four passing orifices formed on two outer walls of the two movable holders, and two toothed sections received in the four through orifices and meshing with and driving the gear.

The four passing orifices of the fixture are configured to lock with the four pneumatic cylinders or four servo motors, and the four pneumatic cylinders or the four servo motors are configured to push four jaws outward or inward. The four jaws include four symmetrical clamping grooves defined therein and configured to clamp at least one material.

The two movable holders of the fixture include four racks corresponding to the four elongated orifice. The four racks are fixed on the top of the fixture, and a respective rack has two rollers disposed on two sides thereof and rolling along a respective elongated orifice.

Thereby, the mechanical arm moves the fixture, the motor drives the gear to actuate the two toothed sections so that the two movable holders are driven by the two toothed sections to adjust the four pneumatic cylinders or four servo motors, and the four pneumatic cylinders or the four servo motors adjust the four symmetrical clamping grooves of the four jaws synchronously to clamp and pick or remove the at least one material.

Preferably, a fixing holder has multiple locking orifices defined thereon and configured to lock with the mechanical arm.

Preferably, a picking mechanism, two baking mechanisms, two cold forming mechanisms, a collection mechanism, and a control apparatus are arranged around the mechanical arm circularly.

Preferably, the mechanical arm, the picking mechanism, the two baking mechanisms, the two cold forming mechanisms, the collection mechanism, and the control apparatus are arranged linearly.

Preferably, the baking mechanism and the two cold forming mechanisms are configured to thermoplastic cold mold the at least one material.

Preferably, a picking mechanism, two hot forming mechanisms, a collection mechanism, and a control apparatus are arranged around the mechanical arm circularly.

Preferably, a picking mechanism, two hot forming mechanisms, a collection mechanism, and a control apparatus are arranged around the mechanical arm linearly.

Preferably, the two hot forming mechanisms are configured to thermoplastic mold the at least one material.

Accordingly, the automatic picking fixture device has advantages as follows:

1) The automatic picking fixture device is applied to manufacture insoles successively in 24 hours daily to maintain stable quality.

2) The automatic picking fixture device facilitates labor and time saving greatly. For example, four workers place and collect the at least one material.

3) The automatic picking fixture device is operated easily to reduce education and training time and cost (such as placing the at least one material and pressing the button easily).

4) The automatic picking fixture device facilitates reduction of staff contact and risk of infection.

BRIEF DESCRIPTION OF THE DRAWINGS

FIG. 14 is a side plan view showing the operation of four jaws of the automatic picking fixture according to the preferred embodiment of the present invention.

FIG. 15 is another side plan view showing the operation of four jaws of the automatic picking fixture according to the preferred embodiment of the present invention.

DETAILED DESCRIPTION OF THE PREFERRED EMBODIMENTS

Figure 1:
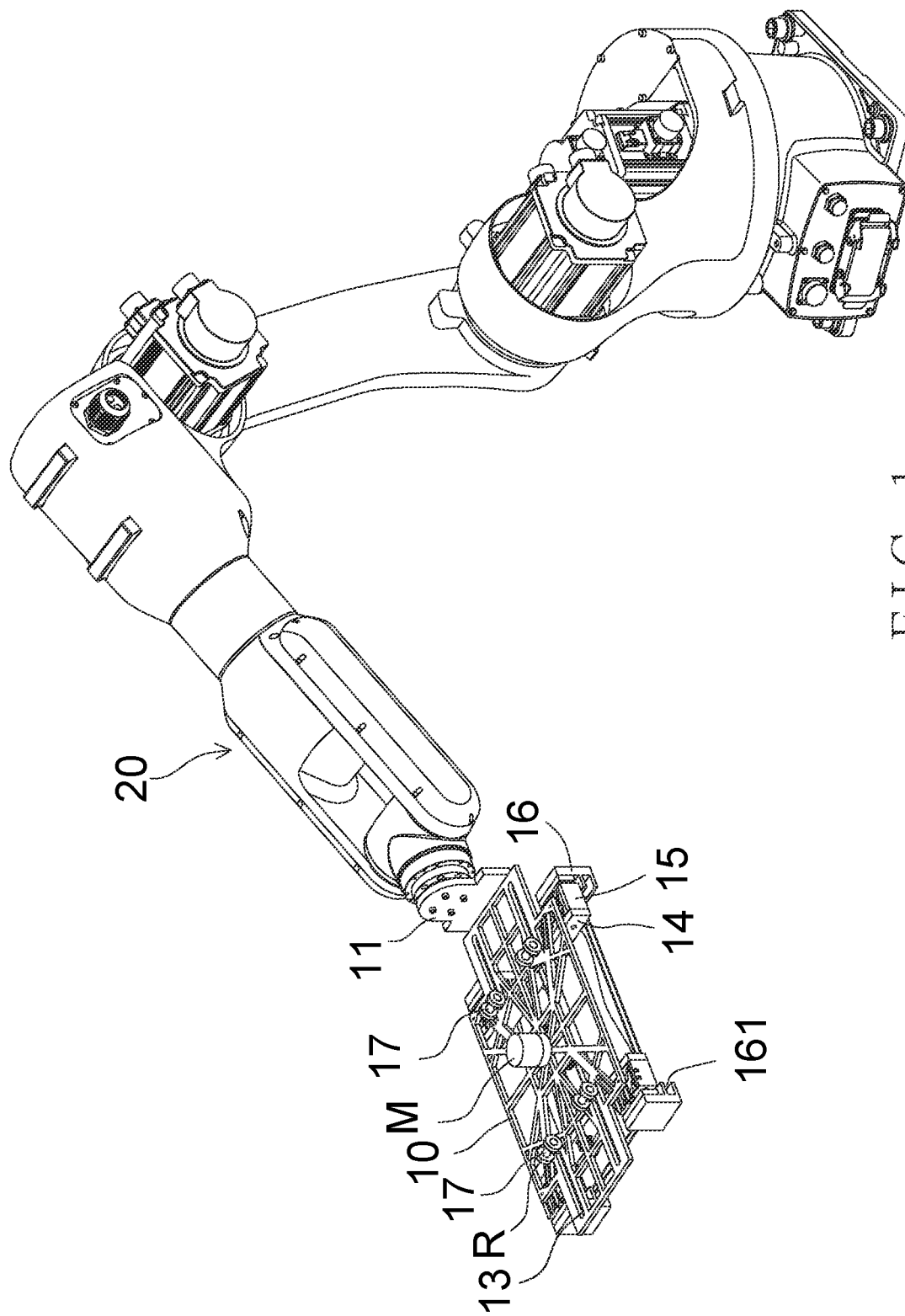
FIG. 1 is a perspective view showing an automatic picking fixture device connected with a mechanical arm according to a preferred embodiment of the present invention.
Figure 2:
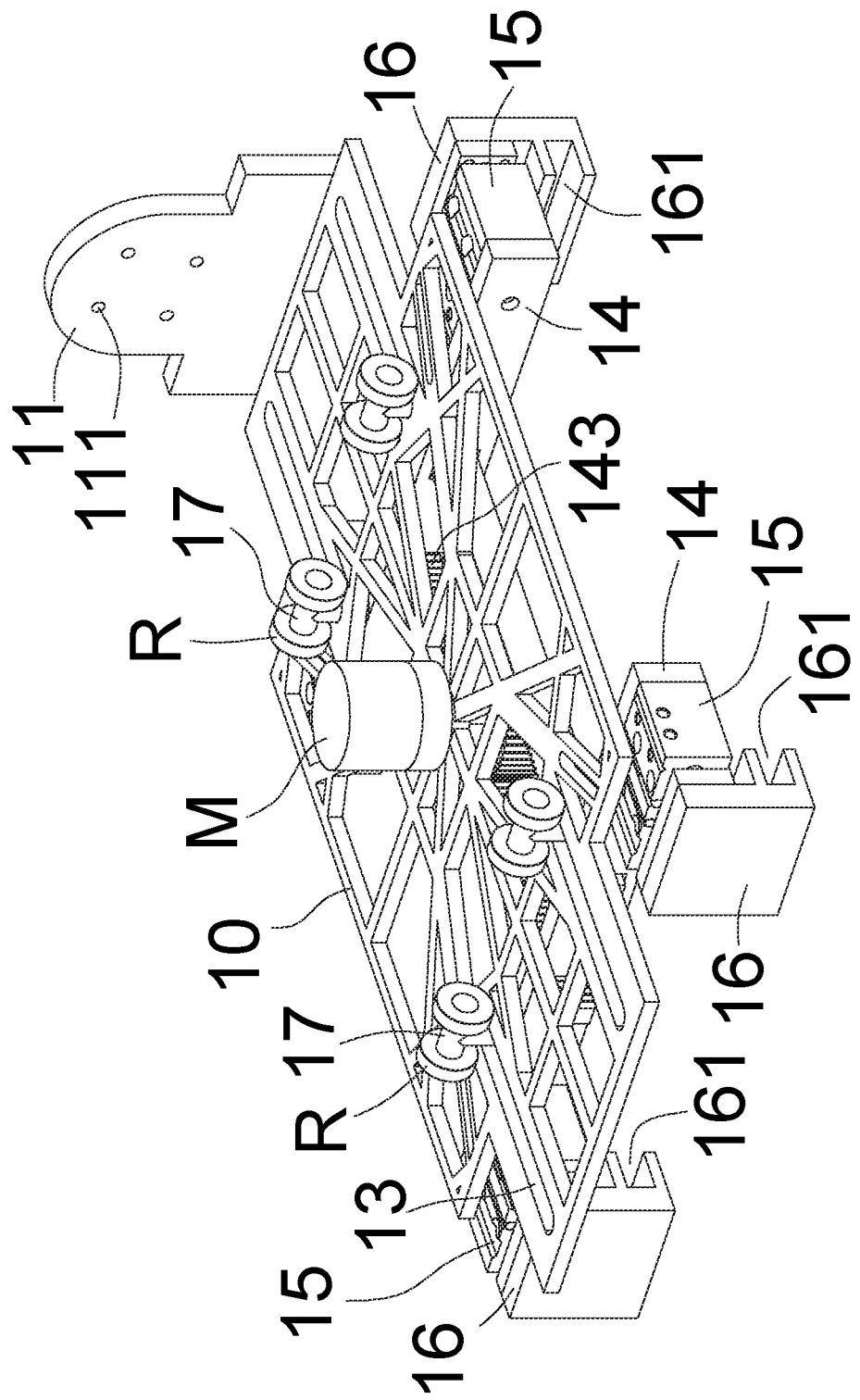
FIG. 2 is a perspective view showing the assembly of the automatic picking fixture device according to the preferred embodiment of the present invention.
Figure 3:
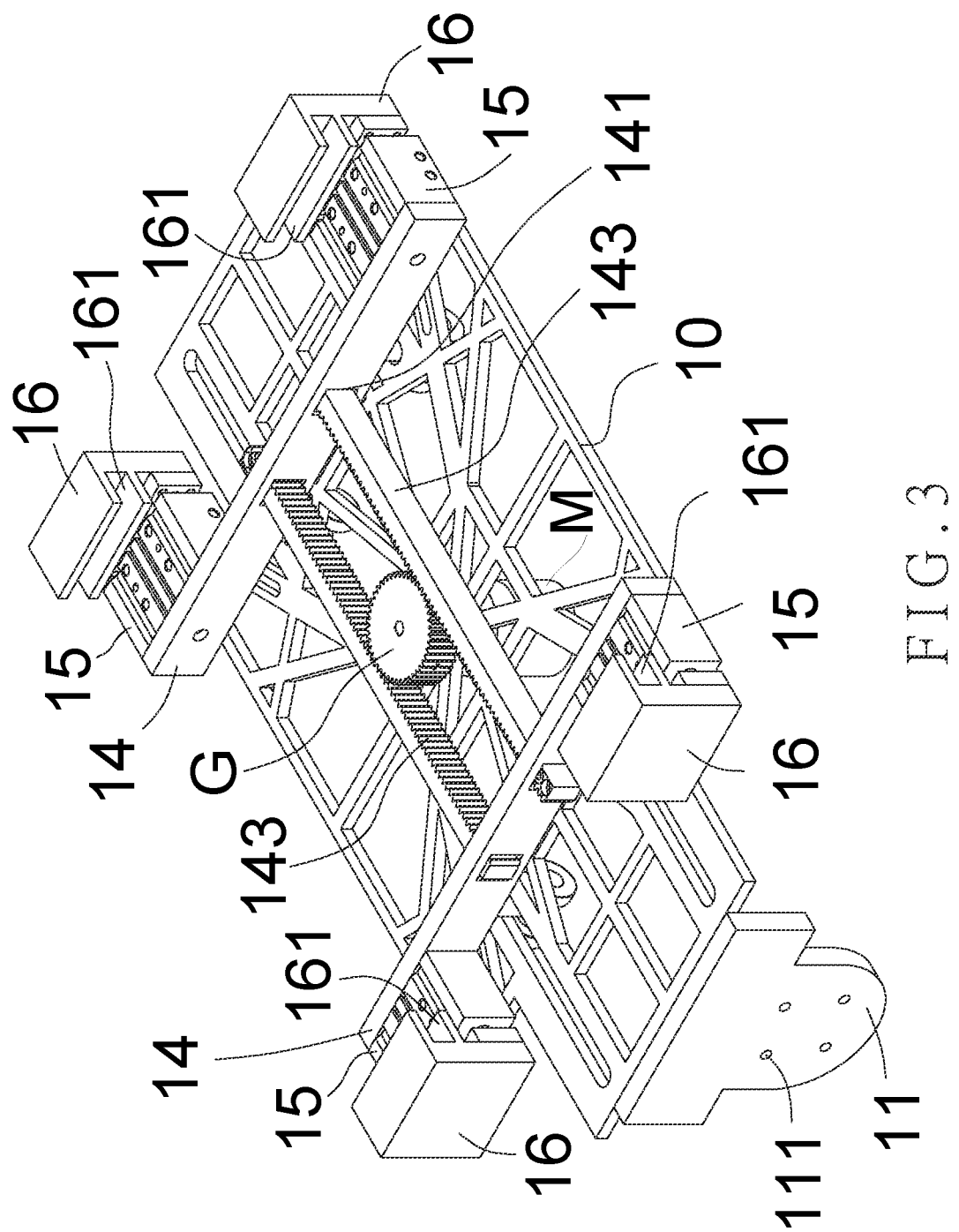
FIG. 3 is another perspective view showing the assembly of the automatic picking fixture device according to the preferred embodiment of the present invention.
Figure 4:
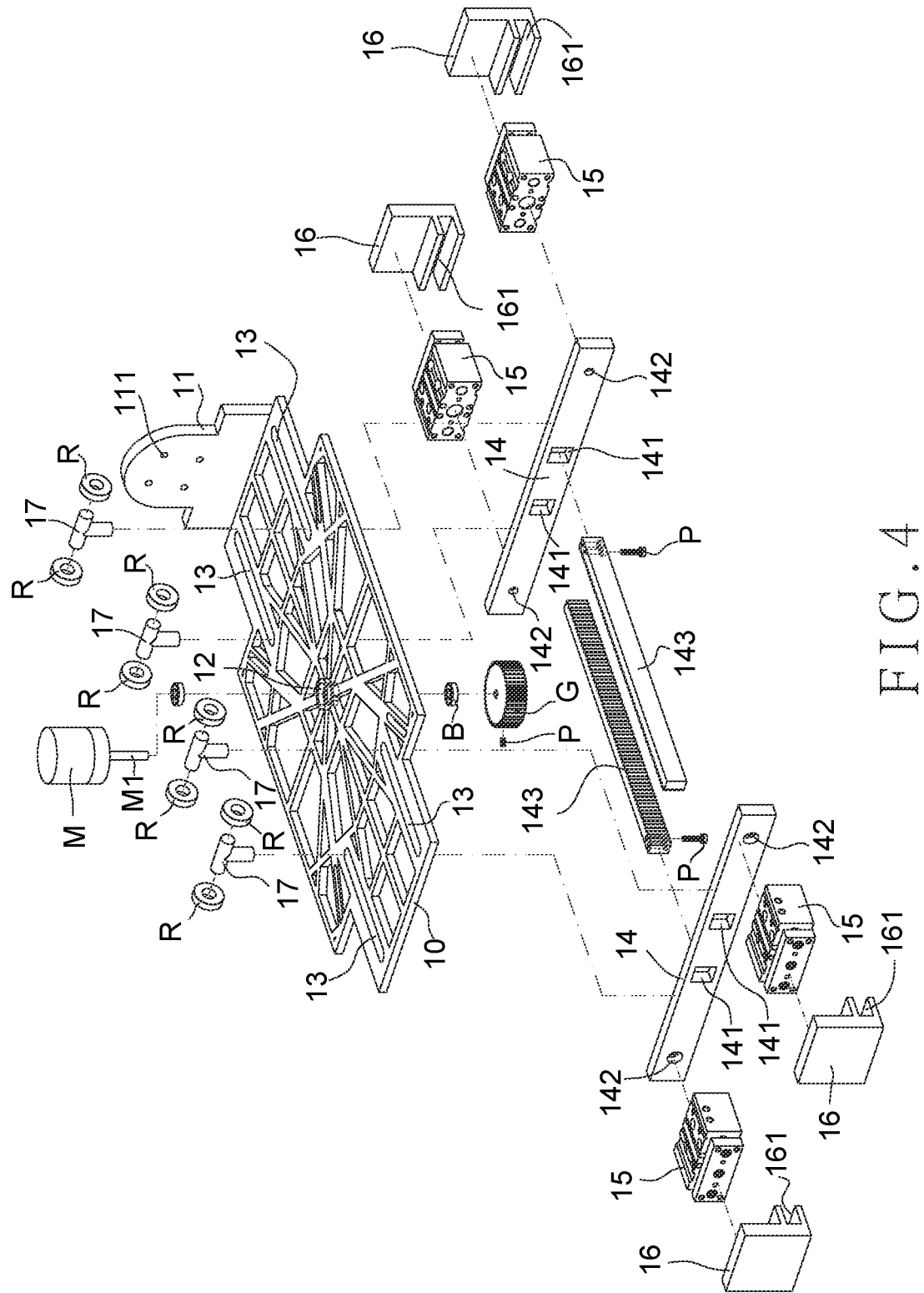
FIG. 4 is a perspective view showing the exploded components of the automatic picking fixture device according to the preferred embodiment of the present invention.
Figure 5:
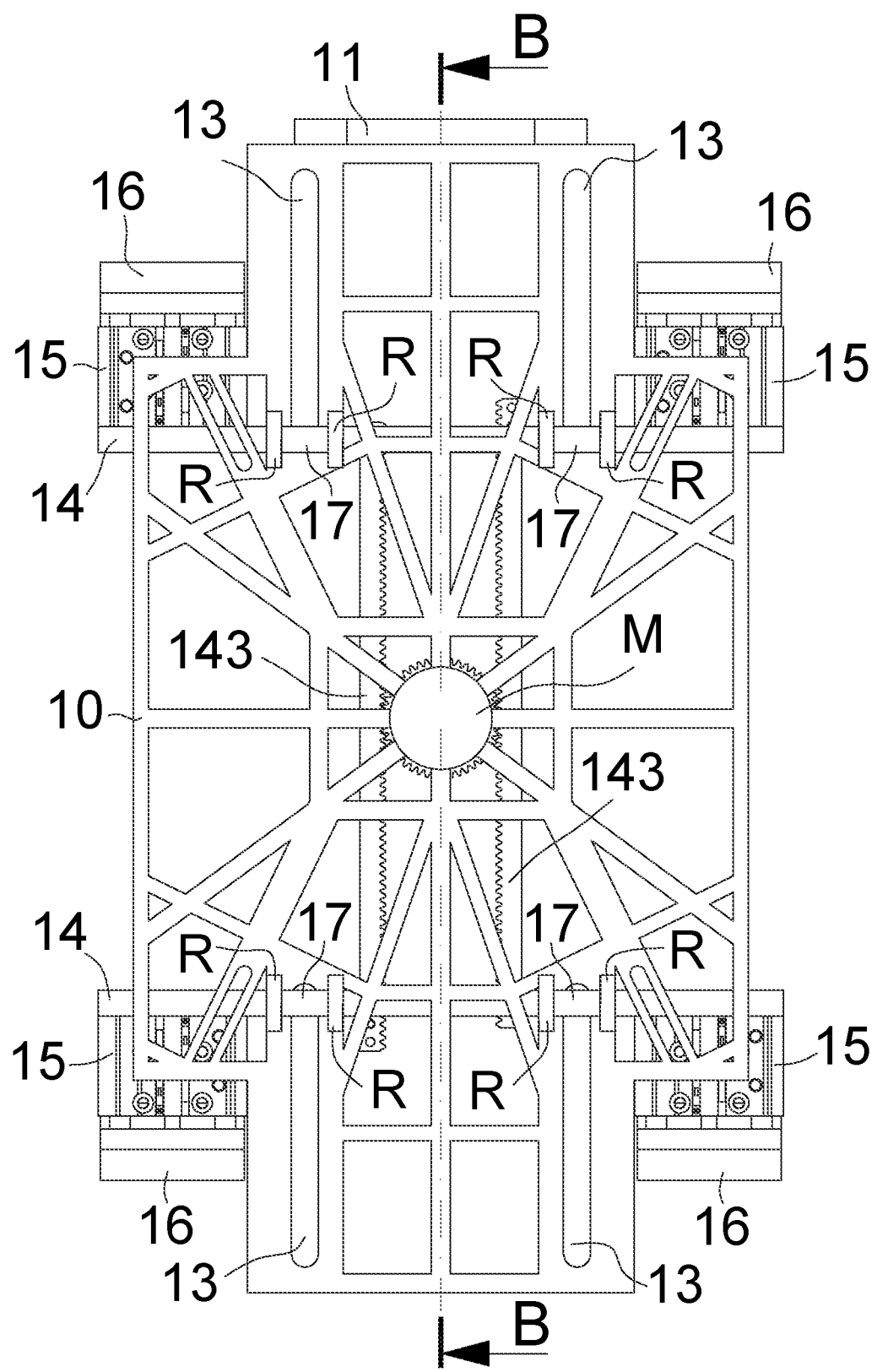
FIG. 5 is a side plan view showing the assembly of the automatic picking fixture device according to the preferred embodiment of the present invention.
Figure 6:
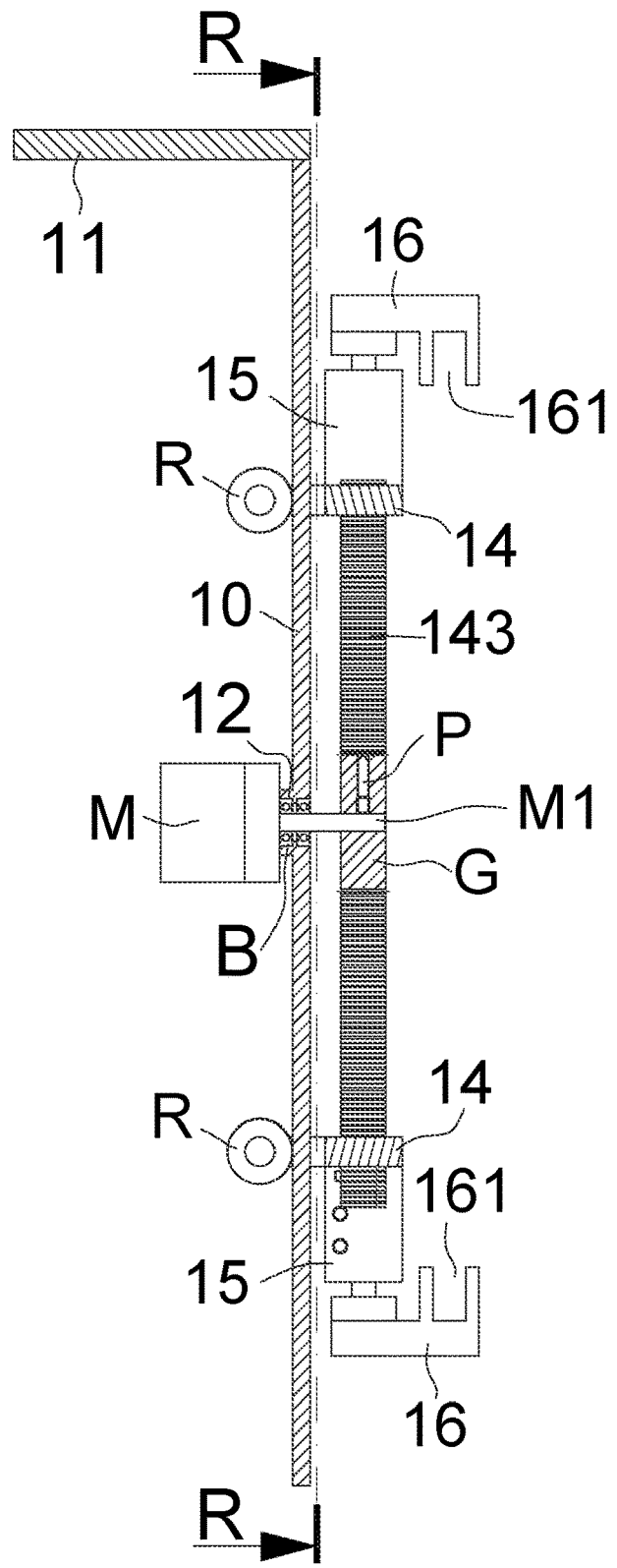
FIG. 6 is a cross sectional view taken along the line B-B of FIG. 5.
Figure 7:
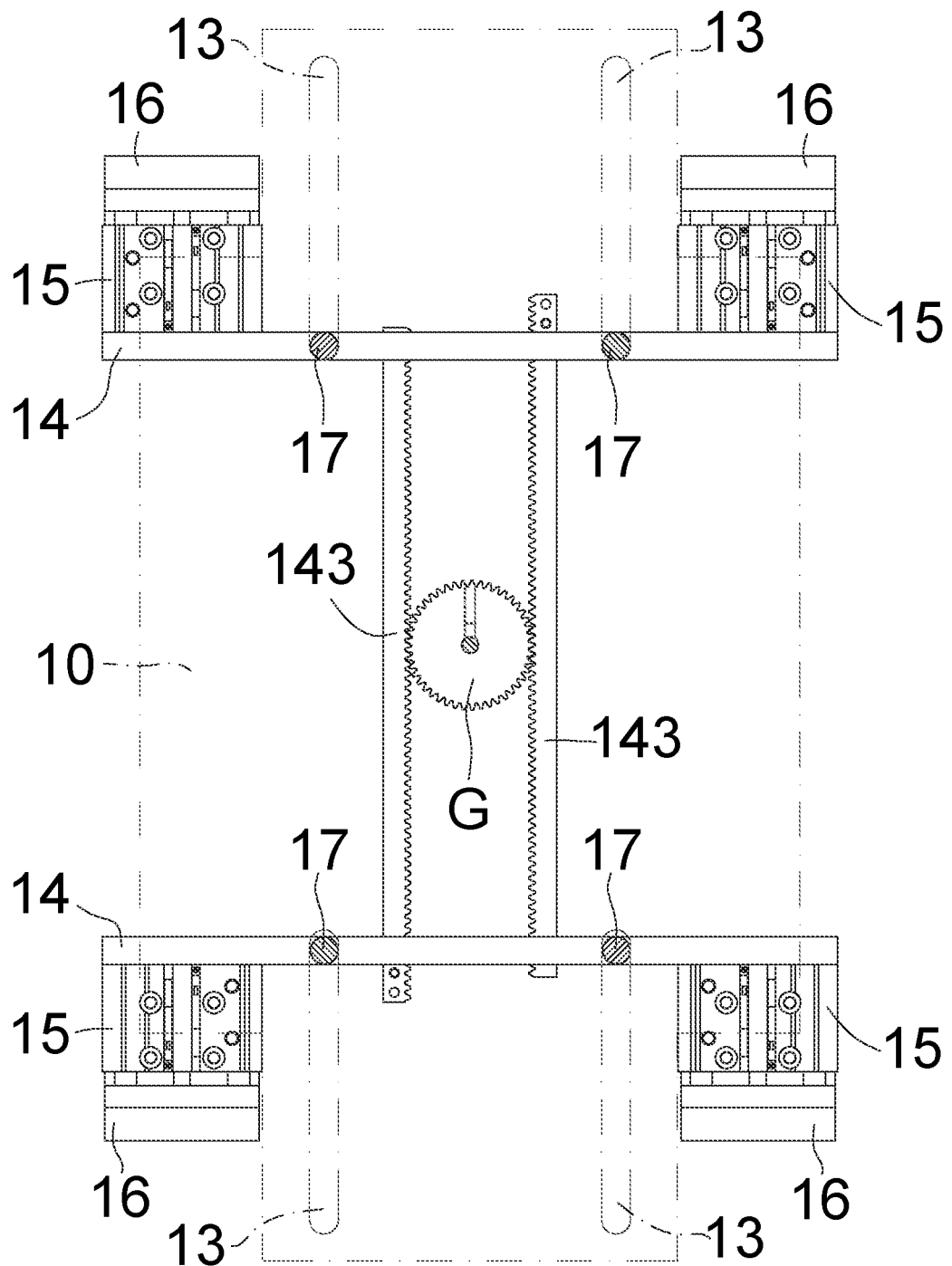
FIG. 7 is a cross sectional view taken along the line R-R of FIG. 6.

FIG. 1 is a perspective view showing an automatic picking fixture device connected with a mechanical arm according to a preferred embodiment of the present invention. FIG. 2 is a perspective view showing the assembly of the automatic picking fixture device according to the preferred embodiment of the present invention. FIG. 3 is another perspective view showing the assembly of the automatic picking fixture device according to the preferred embodiment of the present invention. FIG. 4 is a perspective view showing the exploded components of the automatic picking fixture device according to the preferred embodiment of the present invention. FIG. 5 is a side plan view showing the assembly of the automatic picking fixture device according to the preferred embodiment of the present invention. FIG. 6 is a cross sectional view taken along the line B-B of FIG. 5. FIG. 7 is a cross sectional view taken along the line R-R of FIG. 6.

The automatic picking fixture device according to the preferred embodiment of the present invention comprises: a fixture 10 including a fixing holder 11 on which multiple locking orifices 111 are defined and configured to lock with the mechanical arm 20;

the fixture 10 further including a coupling orifice 12 defined on a center of the fixture 10, a motor M mounted on a top of the fixture 10 and corresponding to the coupling orifice 12, wherein a rotor M1 of the motor M extends out of the coupling orifice 12 and is rotatably connected in the coupling orifice 12 by using two bearings B, and a bottom of the rotor M1 is screwed with a gear G by using a screw P;

the fixture 10 including four elongated orifices 13 formed on two peripheral sides of the fixture 10 parallelly, two movable holders 14 mounted on two sides of a bottom of the fixture 10, wherein the two movable holders 14 have four through orifices 141 defined on two inner walls thereof 14 and corresponding to the gear G, four passing orifices 142 formed on two outer walls of the two movable holders 14, and two toothed sections 143 received in the four through orifices 141, wherein two first ends of the two toothed sections 143 are engaged with one of the two movable holders 14, two second ends of the two toothed sections 143 are engaged with the other movable holder 14, and the two toothed sections 143 mesh with and are driven by the gear G;

the four passing orifices 142 of the fixture 10 being configured to lock with the four pneumatic cylinders 15 or four servo motors, and the four pneumatic cylinders 15 or the four servo motors being configured to push four jaws 16 outward or inward, wherein the four jaws 16 include four symmetrical clamping grooves 161 defined therein and are configured to clamp at least one material 1;

the two movable holders 14 of the fixture 10 including four T-shaped racks 17 corresponding to the four elongated orifice 13, wherein the four T-shaped racks 17 are fixed on the top of the fixture 10, and a respective T-shaped rack 17 has two rollers R disposed on two sides thereof and rolling along a respective elongated orifice 13.

Thereby, the automatic picking fixture device is applicable for a process of manufacturing insoles.

Figure 8:
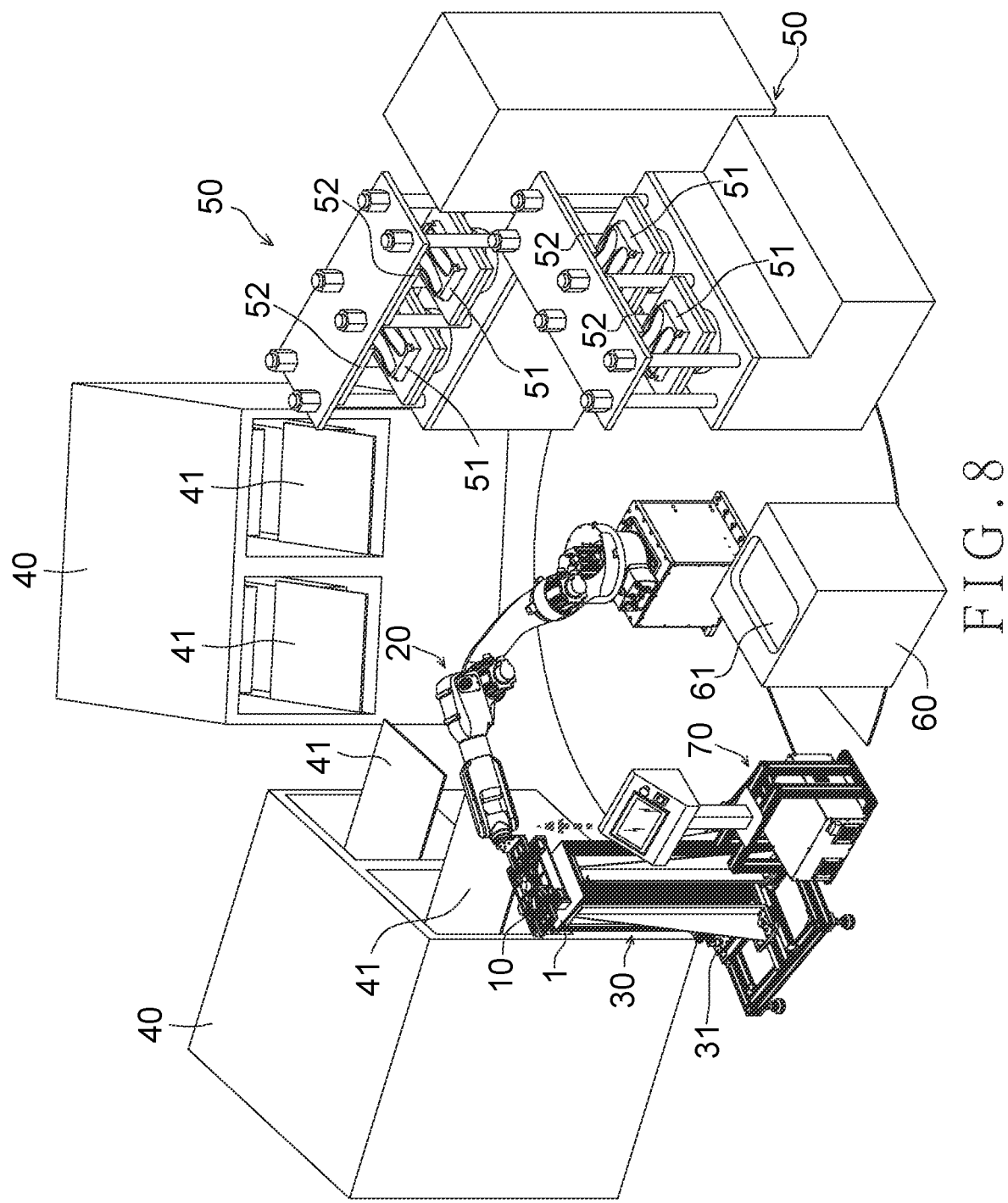
FIG. 8 is a perspective view showing the application of the automatic picking fixture according to the preferred embodiment of the present invention.
Figure 9:
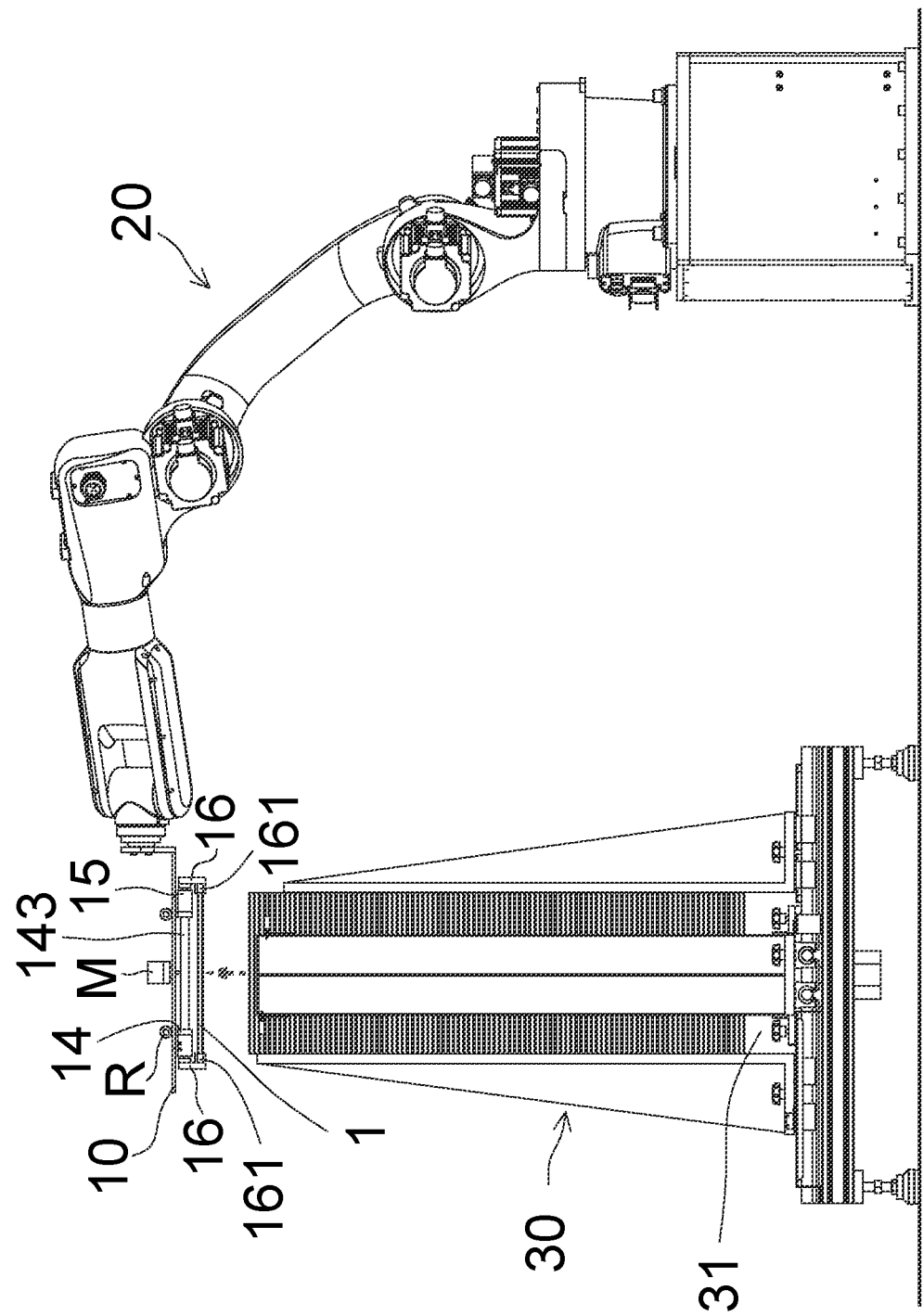
FIG. 9 is a side plan view showing the operation of the automatic picking fixture and the mechanical arm according to the preferred embodiment of the present invention.
Figure 10:
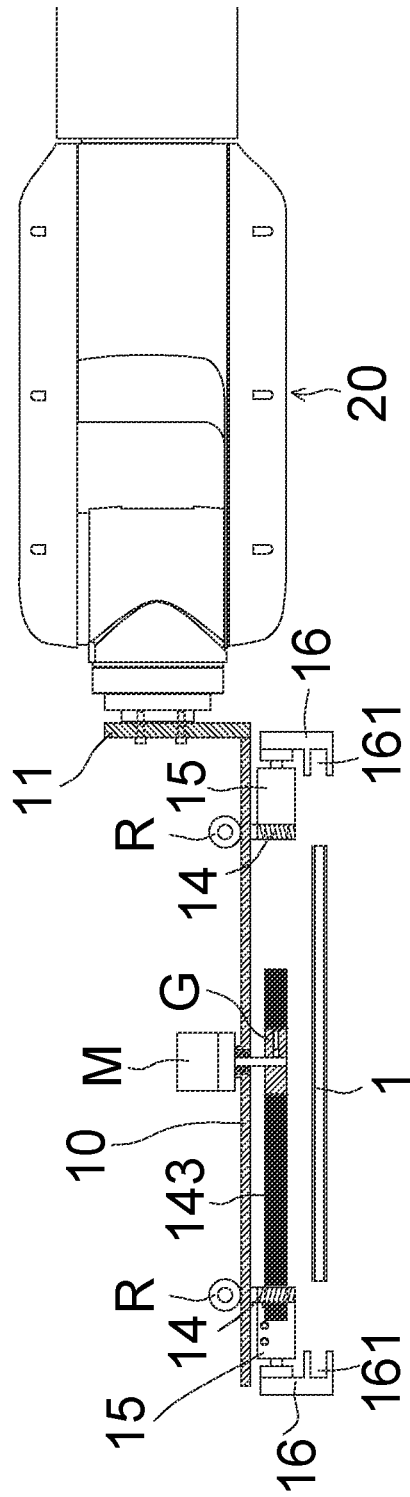
FIG. 10 is a side plan view showing the operation of the automatic picking fixture according to the preferred embodiment of the present invention.
Figure 11:
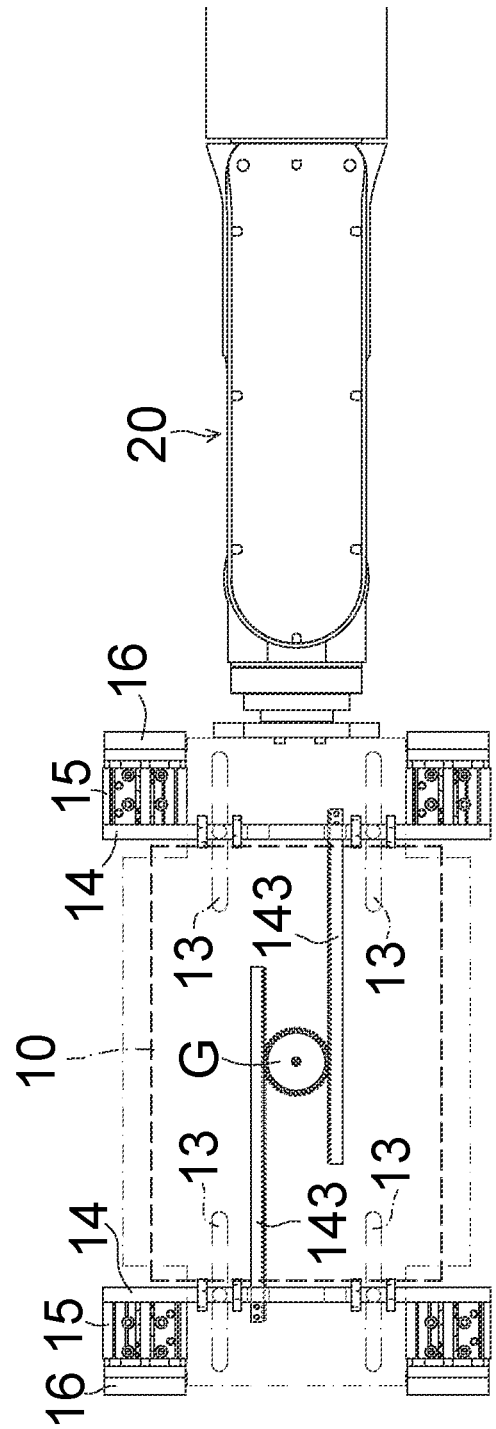
FIG. 11 is another side plan view showing the operation of the automatic picking fixture according to the preferred embodiment of the present invention.
Figure 12:
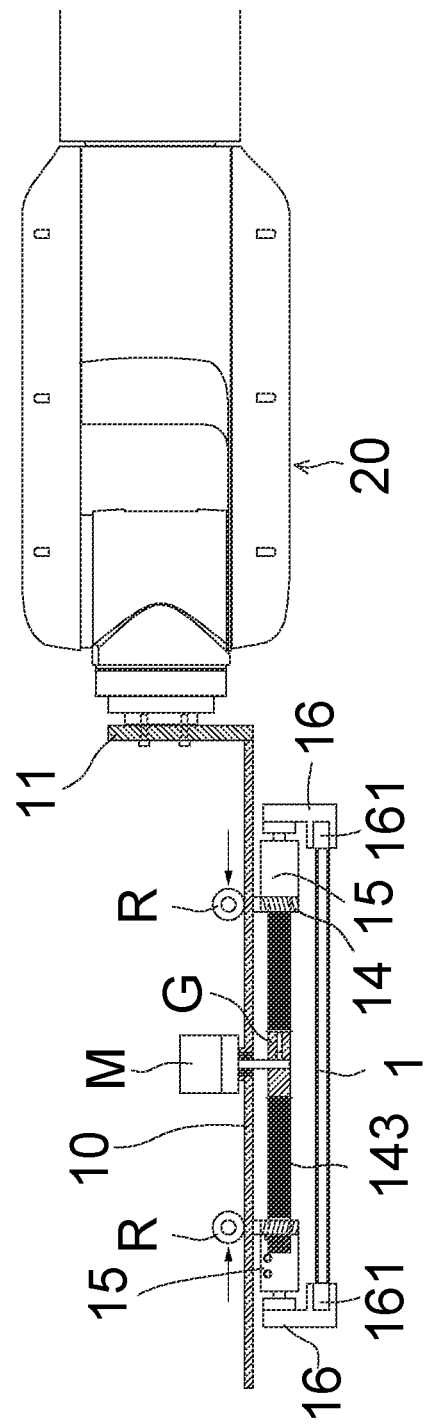
FIG. 12 is also another side plan view showing the operation of the automatic picking fixture according to the preferred embodiment of the present invention.
Figure 13:
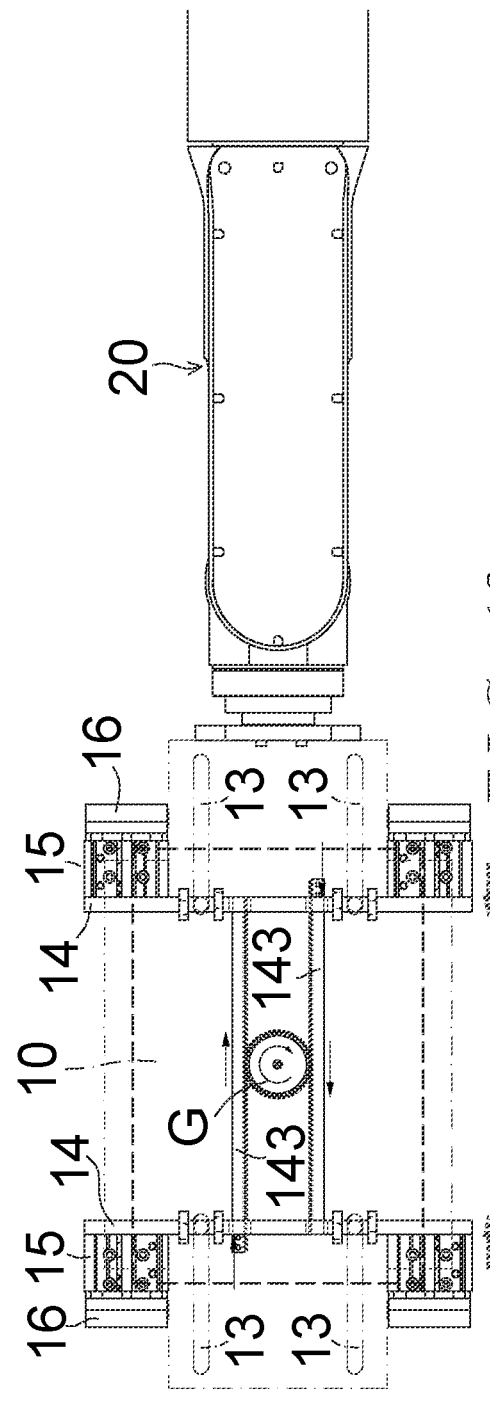
FIG. 13 is still another side plan view showing the operation of the automatic picking fixture according to the preferred embodiment of the present invention.

Referring to FIG. 8, in application, a picking mechanism 30, two baking mechanisms 40, two cold forming mechanisms 50, a collection mechanism 60, and a control apparatus 70 are arranged around the mechanical arm 20 circularly, wherein the picking mechanism 30 includes a moving pedestal 31 on which the at least one material 1 is stacked, after clamping and picking the at least one material 1, the moving pedestal 31 lifts automatically (as shown in FIG. 9), when picking the at least one material, the mechanical arm 20 moves the fixture 10 toward the at least one material 1 of the moving pedestal 31 (as illustrated in FIGS. 10 and 11), and the motor M drives the gear G so that the gear G actuates the two toothed sections 143 to move the two movable holders 14 inward, such that the four pneumatic cylinders 15 or the four servo motors are moved by the movable holders 14 (as shown in FIGS. 12 and 13), then the four pneumatic cylinders 15 or the four servo motors synchronously drive the four jaws 16 to move inward so that the four jaws 16 clamp and pick the at least one material 1 by way of the four symmetrical clamping grooves 161 (as shown in FIG. 14), thereafter the mechanical arm 20 moves the fixture 10 toward the two baking mechanisms 40, and the four pneumatic cylinders 15 or the four servo motors synchronously drive the four jaws 16 to move outward so that the four symmetrical clamping grooves 161 of the four jaws 16 remove the at least one material 1 (as shown in FIG. 15).

Figure 16:
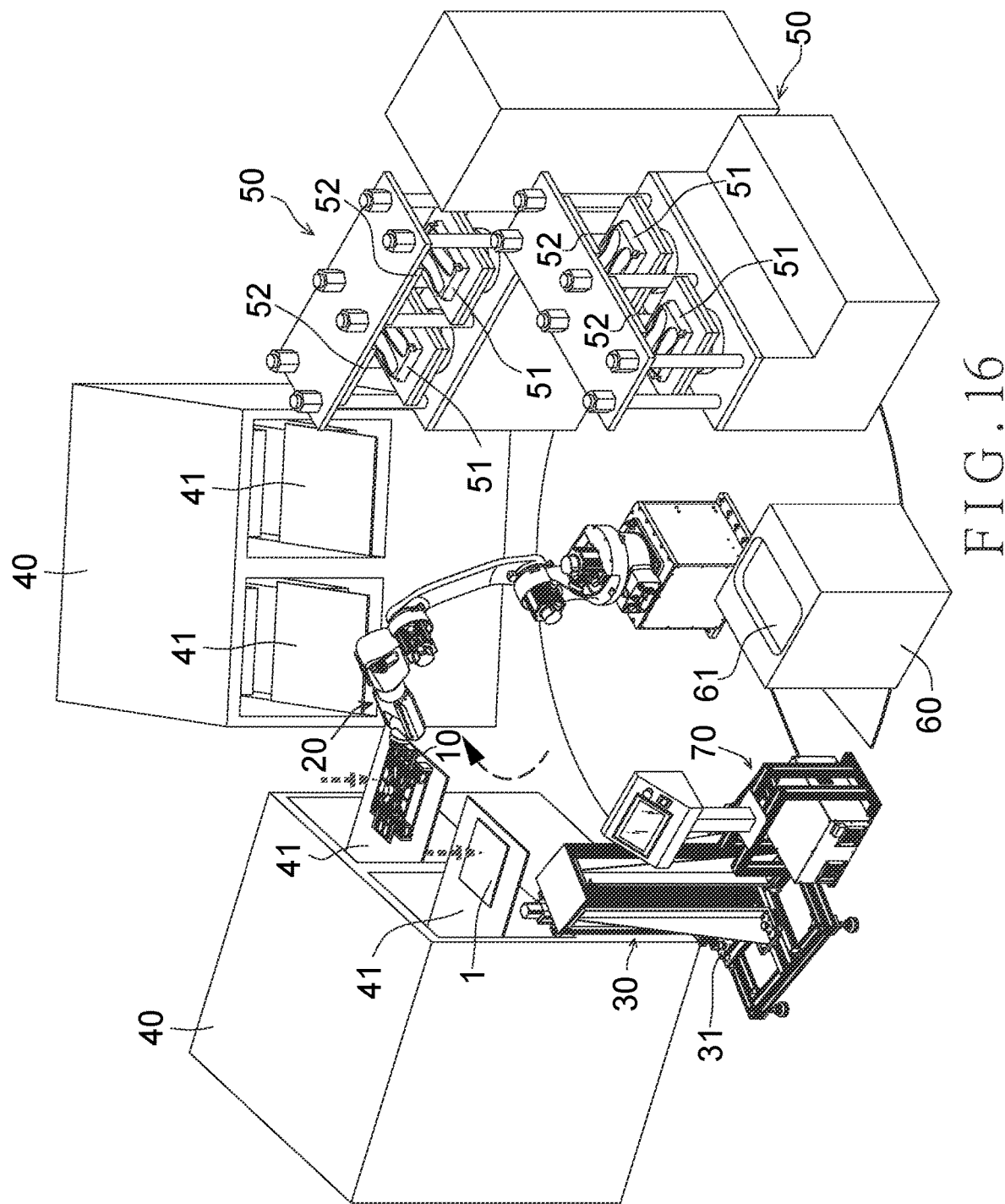
FIG. 16 is a perspective view showing the operation of the automatic picking fixture and the mechanical arm according to another preferred embodiment of the present invention.
Figure 17:
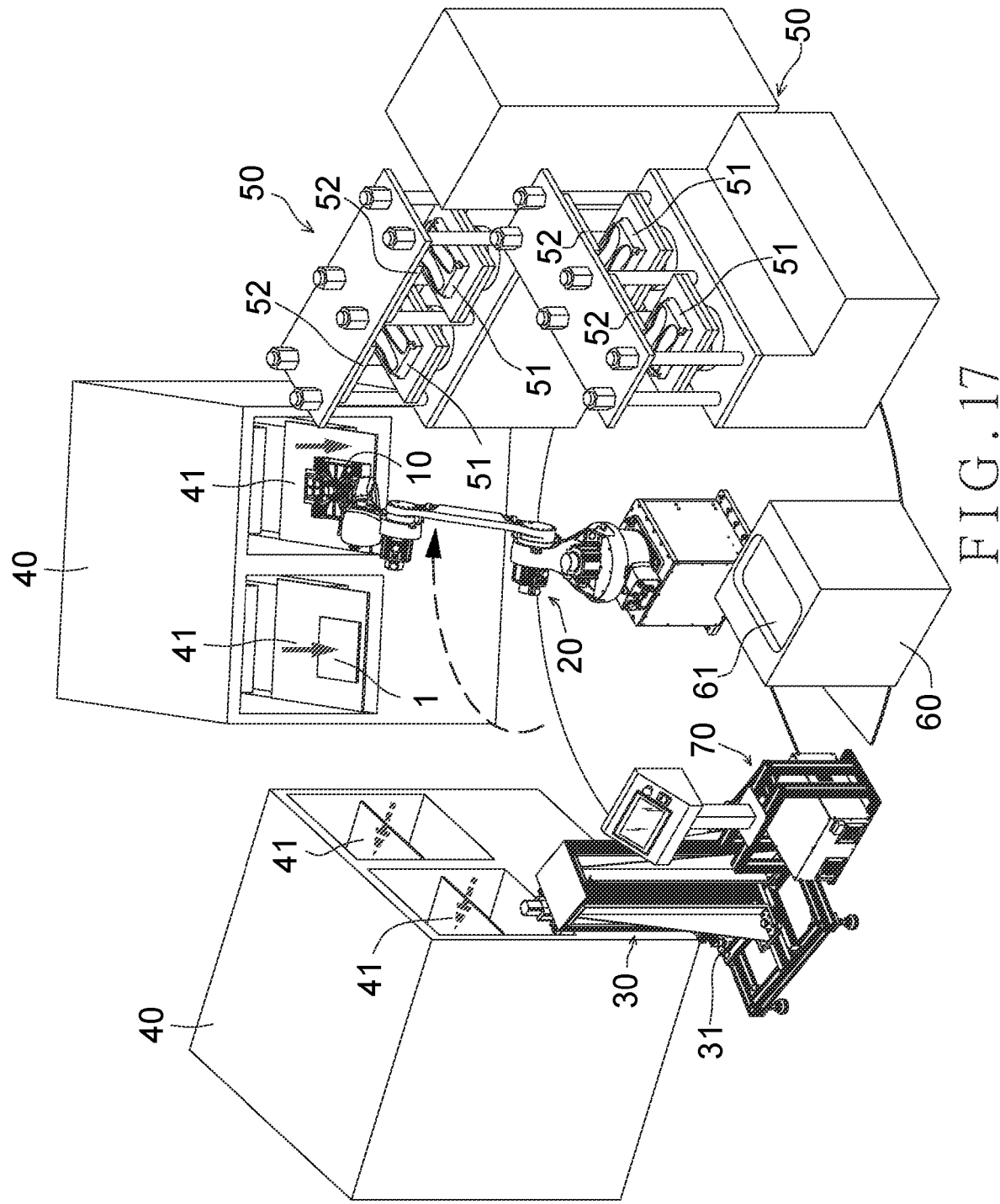
FIG. 17 is another perspective view showing the operation of the automatic picking fixture and the mechanical arm according to another preferred embodiment of the present invention.

FIGS. 16 and 17 are a perspective view showing the operation of the two baking mechanisms 40, wherein the two baking mechanisms 40 are configured to bake the at least one material 1 efficiently so as to reduce a heated time of the at least one material 1. A respective baking mechanism 40 includes multiple fixing trays 41 configured to accommodate and to move the at least one material 1 into the respective baking mechanism 40, such that the at least one material 1 is heated and backed to a predetermined temperature, and the multiple fixing trays 41 deliver the at least one material 1 out of the respective baking mechanism 40 so that the mechanical arm 20 moves the fixture 10 by which some materials are moved into one cold forming mechanism 50 from the one baking mechanism 40.

Figure 18:
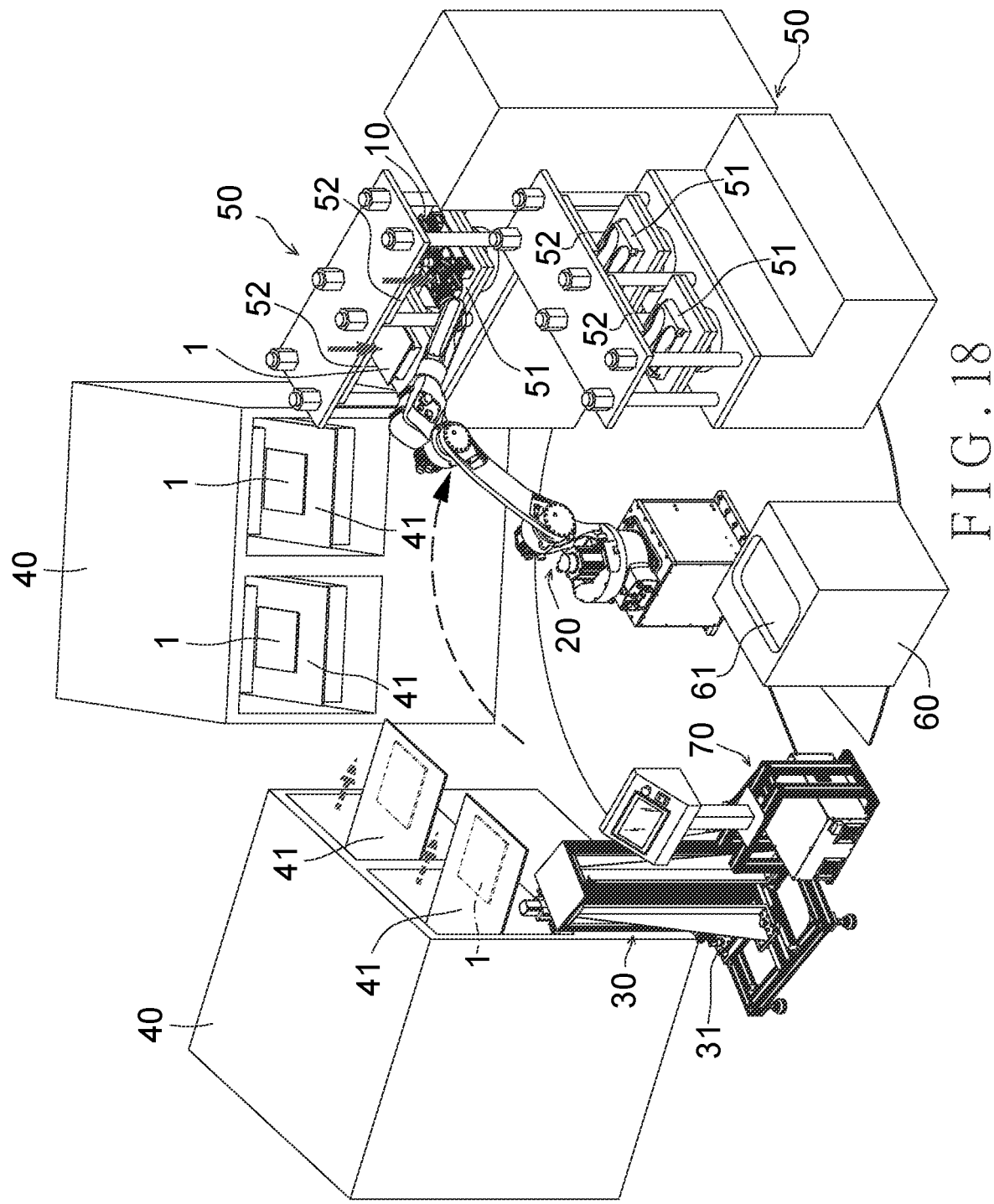
FIG. 18 is also perspective view showing the operation of the automatic picking fixture and the mechanical arm according to another preferred embodiment of the present invention.
Figure 19:
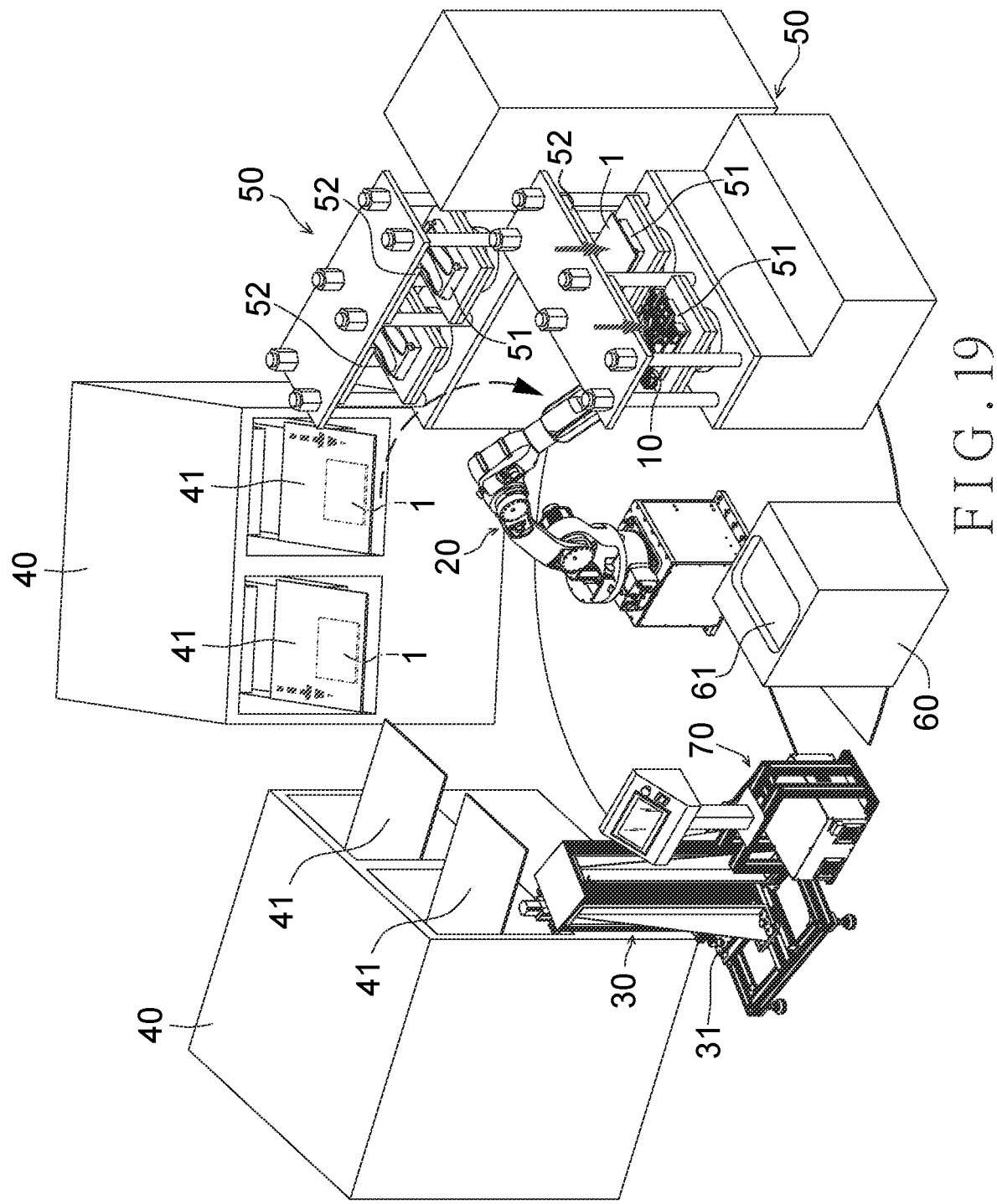
FIG. 19 is still another perspective view showing the operation of the automatic picking fixture and the mechanical arm according to another preferred embodiment of the present invention.

With reference to FIGS. 18 and 19 are a perspective view showing the operation of the two cold forming mechanisms 50, wherein the two cold forming mechanisms 50 mate with the two baking mechanisms 40 to cold form the at least one material efficiently so as to avoid a waiting time of cold forming the at least one material 1. A respective cold forming mechanism 50 includes two first molds 51 and two second molds 52, such that the mechanical arm 20 moves the fixture 10 toward one cold forming mechanism 50 and to place the at least one material on the two first molds 51, and the two second molds 50 move to contact with the two second molds 51, thus cold forming the at least one material 1. After the two first molds 51 remove from the two second molds 52, the four jaws 16 clamp and pick at least one semi-finished product 2 molded from the at least one material 1 by using the four symmetrical clamping grooves 161.

Figure 20:
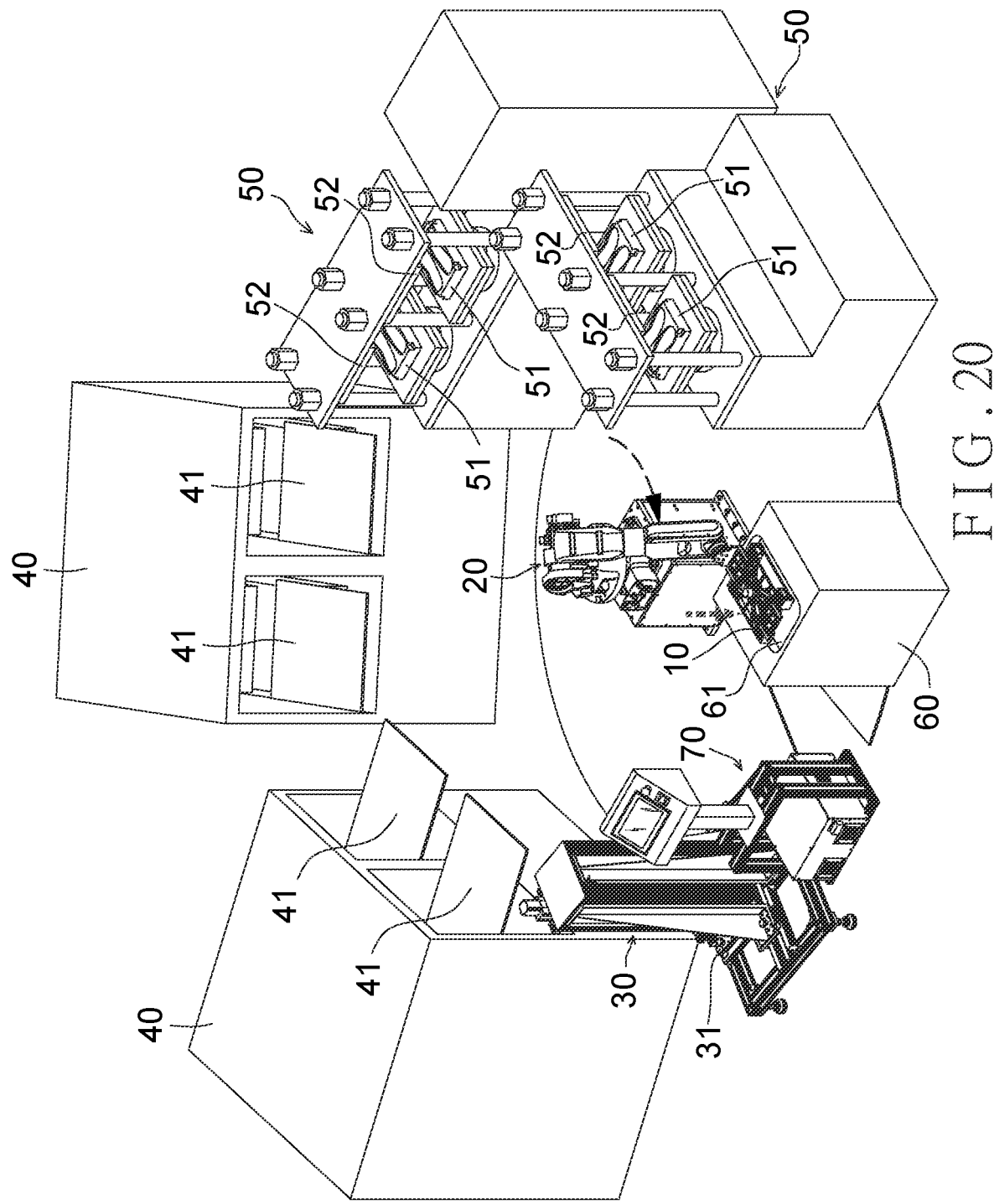
FIG. 20 is another perspective view showing the operation of the automatic picking fixture and the mechanical arm according to another preferred embodiment of the present invention.

FIG. 20 is a perspective view showing the operation of the automatic picking fixture device. The collection mechanism 60 includes an accommodation platform 61 configured to receive the at least one semi-finished product 2, the mechanical arm 20 moves the fixture 10, and the four jaws 16 clamp and pick the at least one semi-finished product 2 by using the four symmetrical clamping grooves 161, then the at least one semi-finished product 2 is placed on the accommodation platform 61 of the collection mechanism 60, thus manufacturing the insoles completely.

The control apparatus 70 includes a computer or a programmable logic and a System on a Chip (SoC), a radiofrequency identification (RFID), and a button which are configured to control the mechanical arm 20, the picking mechanism 30, the two baking mechanisms 40, the two cold forming mechanisms 50, the collection mechanism 60, the control apparatus 70 and other apparatus which is arranged on the mechanical arm 20, the picking mechanism 30, the two baking mechanisms 40, and the two cold forming mechanisms 50.

In another embodiment, the mechanical arm 20, the picking mechanism 30, the two baking mechanisms 40, the two cold forming mechanisms 50, the collection mechanism 60, and the control apparatus 70 are arranged linearly. In another embodiment, the baking mechanism 40 and the two cold forming mechanisms 50 are configured to thermoplastic cold mold the at least one material. Alternatively, the two cold forming mechanisms 50 are replaced by two hot forming mechanisms and are configured to thermoplastic mold the at least one material.

While the preferred embodiments of the invention have been set forth for the purpose of disclosure, modifications of the disclosed embodiments of the invention as well as other embodiments thereof may occur to those skilled in the art. The scope of the claims should not be limited by the preferred embodiments set forth in the examples, but should be given the broadest interpretation consistent with the description as a whole.

What is claimed is:

1. An automatic picking fixture device comprising:
   a fixture locked with a mechanical arm and including a coupling orifice defined on a center of the fixture, a motor mounted on a top of the fixture and corresponding to the coupling orifice, and a rotor of the motor rotatably connected in the coupling orifice, a bottom of the rotor being screwed with a gear;
   the fixture including four elongated orifices formed on two peripheral sides of the fixture parallelly, two movable holders mounted on two sides of a bottom of the fixture, the two movable holders having four through orifices defined on two inner walls thereof and corresponding to the gear, four passing orifices formed on two outer walls of the two movable holders, and two toothed sections received in the four through orifices meshing with and driven by the gear;
   the four passing orifices of the fixture configured to lock with the four pneumatic cylinders or four servo motors, and the four pneumatic cylinders or the four servo motors configured to push four jaws outward or inward, the four jaws including four symmetrical clamping grooves defined therein and configured to clamp at least one material;
   the two movable holders of the fixture including four racks corresponding to the four elongated orifice, wherein the four racks are fixed on the top of the fixture, and a respective rack has two rollers disposed on two sides thereof and rolling along a respective elongated orifice.

2. The automatic picking fixture device as claimed in claim 1, wherein a fixing holder has multiple locking orifices defined thereon and configured to lock with the mechanical arm.

3. The automatic picking fixture device as claimed in claim 1 being surrounded by a structure, wherein the structure includes: a picking mechanism, two baking mechanisms, two cold forming mechanisms, a collection mechanism, and a control apparatus are arranged around the mechanical arm circularly.

4. The automatic picking fixture device as claimed in claim 3, wherein the baking mechanism and the two cold forming mechanisms are configured to thermoplastic cold mold the at least one material.

5. The automatic picking fixture device as claimed in claim 1 being surrounded by a structure, wherein the structure includes a mechanical arm, a picking mechanism, two baking mechanisms, two cold forming mechanisms, a collection mechanism, and a control apparatus are arranged linearly.

6. The automatic picking fixture device as claimed in claim 5, wherein a picking mechanism, two hot forming mechanisms, a collection mechanism, and a control apparatus are arranged around the mechanical arm circularly.

7. The automatic picking fixture device as claimed in claim 6, wherein the two hot forming mechanisms are configured to thermoplastic mold the at least one material.

8. The automatic picking fixture device as claimed in claim 1 being surrounded by a structure, wherein the structure includes a picking mechanism, two hot forming mechanisms, a collection mechanism, and a control apparatus are arranged around the mechanical arm circularly.

9. The automatic picking fixture device as claimed in claim 8, wherein the two hot forming mechanisms are configured to thermoplastically mold the at least one material.

10. The automatic picking fixture device as claimed in claim 1 located beside a structure, wherein the structure includes a picking mechanism, two hot forming mechanisms, a collection mechanism, and a control apparatus are arranged around the mechanical arm linearly.

* * * * *